United States Patent [19]

Holbrook

[11] Patent Number: 4,543,729
[45] Date of Patent: Oct. 1, 1985

[54] CLAMP FOR A TOOLING BALL AND A METHOD FOR ESTABLISHING A PLANE FOR LAY-OUT PURPOSES

[76] Inventor: Glenn E. Holbrook, 2226 S. Walnut, Wichita, Kans. 67213

[21] Appl. No.: 555,663

[22] Filed: Nov. 28, 1983

[51] Int. Cl.⁴ .................... G01C 15/06; G01B 11/30
[52] U.S. Cl. ........................................ 33/293; 33/299
[58] Field of Search ................ 33/293; 9/299, 174 H; 248/288.3, 288.5, DIG. 4, 278, 279

[56] References Cited

U.S. PATENT DOCUMENTS

| | | | |
|---|---|---|---|
| 665,024 | 1/1901 | Lister | 33/287 |
| 1,816,700 | 7/1931 | Rosen | 248/288.3 X |
| 3,730,470 | 5/1973 | Mitchell | 33/293 X |
| 4,085,512 | 4/1978 | Bod | 33/293 |

*Primary Examiner*—Harry N. Haroian
*Attorney, Agent, or Firm*—John H. Widdowson

[57] ABSTRACT

A clamp for a tooling ball having a base plate, a ball stand secured to the base plate, and a tooling ball bound to the ball stand. A clamp assembly rotatably sandwiches the tooling ball and supports a scale, or the like, for rotation about the tooling ball. A method for establishing a plane for lay-out purposes with a clamp assembly supporting a scale and rotatably sandwiching a tooling ball bound to the tool ball stand supported on a base plate. The method comprises positioning a pair of the clamp assemblies on a jig under construction such that the scale is in a position to measure vertical distances from the jig under construction. The method additionally comprises situating an independent scale across the two scales of the pair of clamp assemblies such that a horizontal edge of the independent scale defines and identifies the established plane for lay-out purposes.

5 Claims, 9 Drawing Figures

CLAMP FOR A TOOLING BALL AND A METHOD FOR ESTABLISHING A PLANE FOR LAY-OUT PURPOSES

BACKGROUND OF THE INVENTION

1. Field of the Invention

This invention provides a novel clamp for a tooling ball. More specifically, this invention contemplates a novel clamp for a tooling ball and a method for establishing a plane for lay-out purposes.

2. Description of the Prior Art

U.S. Pat. No. 862,563 by Kerr, et al discloses a ball clamp arrangement. U.S. Pat. No. 2,909,351 by Pratt illustrates a ball and socket arrangement wherein the ball is not disposed intermediately between the ends of the clamping plates. U.S. Pat. No. 2,354,046 by Oslund discloses an indicator holder wherein the holder is supported by a pair of clamping plates. None of the foregoing prior art teach or suggests the particular clamp for a tooling ball and the method for establishing a plane for lay-out purposes of this invention.

SUMMARY OF THE INVENTION

This invention accomplishes its desired objects by providing a novel clamp for a tooling ball comprising a base plate means, and a ball stand means secured to the base plate means. A tooling ball means is bound to the ball stand means. A clamp assembly means rotatably sandwiches the tooling ball means and supports the scale means, or the like, for rotation about the tooling ball means. A method for establishing a plane for lay-out purposes with a clamp assembly means supporting a scale means and rotatably sandwiching a tooling ball means integral with a tool ball stand supported on a base plate means. The method comprises the steps of positioning a pair of the clamp assemblies means on a jig means under construction such that the scale means is in a position to measure vertical distances from the jig means under construction. The method additionally includes situating an independent scale means across the two scale means of the pair of clamp assembly means such that a horizontal edge of the independent means defines and identifies the established plane for lay-out purposes.

It is an object of the invention to provide a novel clamp for a tooling ball which is capable of easily being assembled.

Still further objects of the invention reside in a method for establishing a plane for lay-out purposes and a novel clamp for a tooling ball which can easily be operated and is relatively inexpensive to manufacture.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 1:
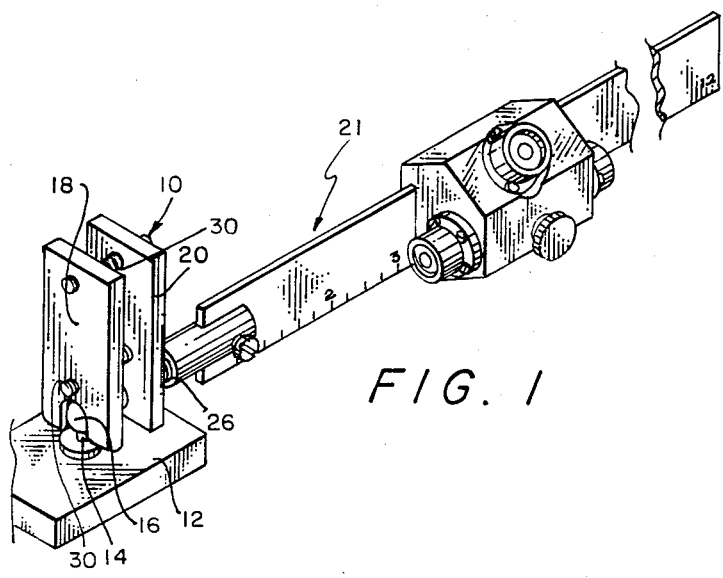
FIG. 1 is a perspective view of the invention engaged with a scale means.
Figure 3:
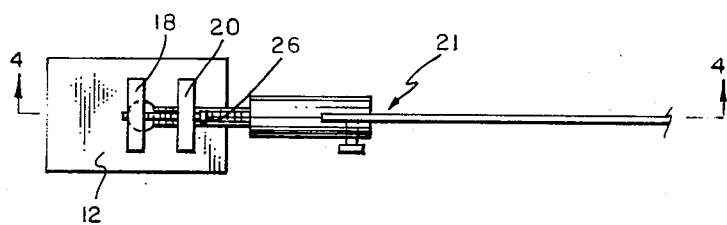
FIG. 3 is a top plan view of the invention in FIG. 1.
Figure 2:
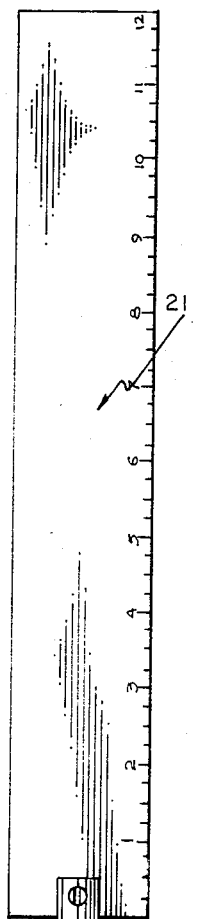
FIG. 2 is a front elevational view of the invention engaged to a scale that is capable of measuring vertical distances away from the base of the invention.
Figure 2:
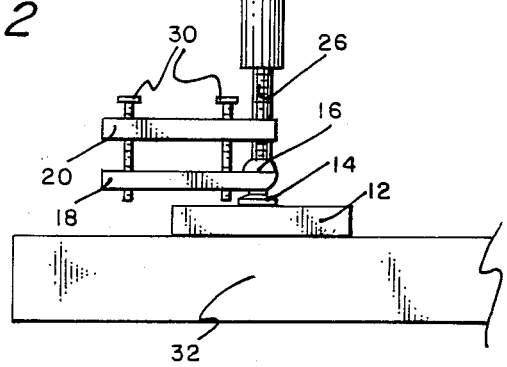
Figure 4:
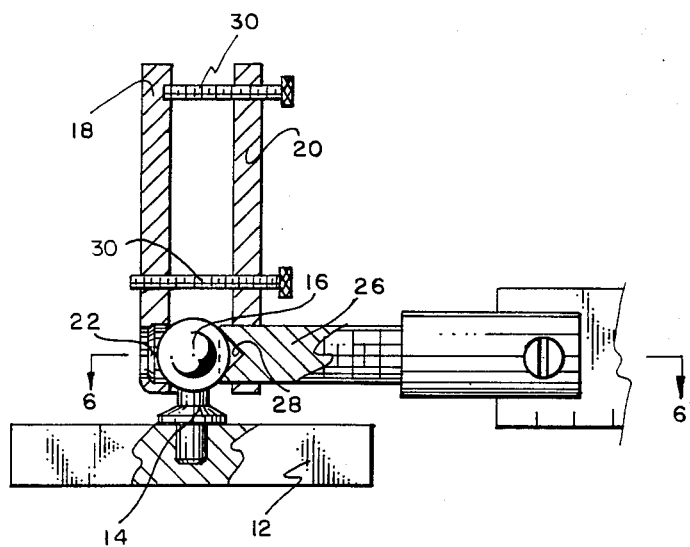
FIG. 4 is a vertical sectional view taken in direction of the arrows and along the plane of line 4—4 in FIG. 3.
Figure 5:
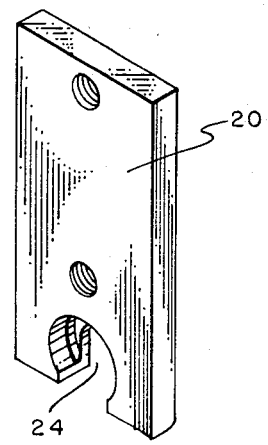
FIG. 5 is a perspective view of one of the plates of the clamp assembly.
Figure 6:
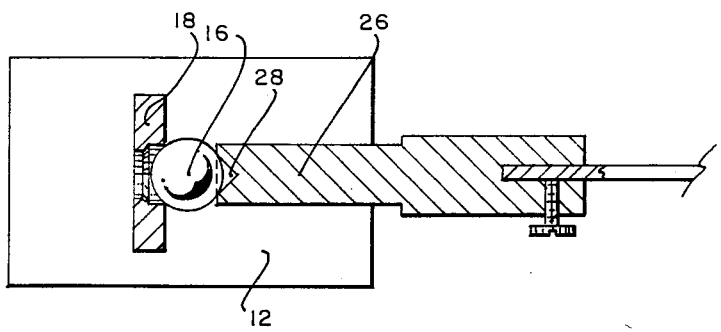
FIG. 6 is a horizontal sectional view taken in direction of the arrows and along the plane of line 6—6 in FIG. 4.
Figure 7:
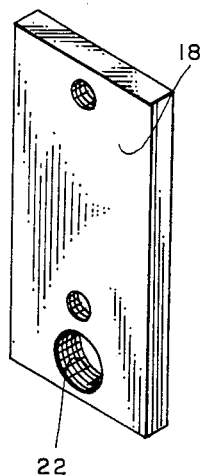
FIG. 7 is a perspective view of another plate of the clamp assembly.
Figure 8:
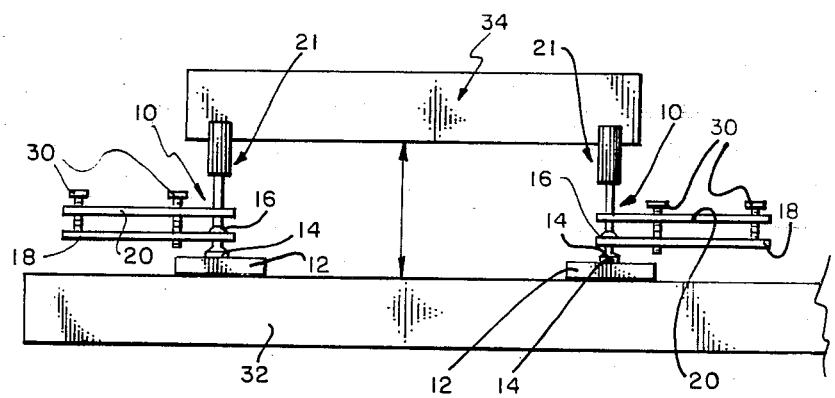
FIG. 8 is a front elevational view of a pair of clamp and scale assemblies supporting an independent scale in order to establish a plane for lay-out purposes.

Referring in detail now to the drawings, wherein like numerals designate similar parts throughout the various views, there is seen a clamp means, generally illustrated as 10, of this invention. The clamp 10 includes a base plate 12 and a ball stand 14 secured to the base plate 12. A tooling ball 16 is bound integrally to the ball stand 14. Clamp 10 additionally comprises a first plate 18 and a second plate 20 which sandwich the tooling ball 16 and supports a scale means, generally illustrated as 21, or the like, for rotation about the tooling ball 16. Plate 18 has an aperture 22 (see FIG. 7) which has a diameter smaller than the diameter of the tooling ball 16. Aperture 22 is situated at the lower part of the plate 18 for seating the tooling ball 16. Plate 20 has a structure whose lower edge terminates into a generally semi-circular aperture 24 (see FIG. 5) wherethrough a scale shaft 26 passes. Scale shaft 26 terminates into an end 28 (see FIG. 4 and FIG. 6) which is generally compatible with the outside of the tooling ball 16 to facilitate the rotation of the clamp 10, including the scale means 21, about the tooling ball 16. A pair of tension screws 30—30 threadably engage both the first plate 18 and the second plate 20 in a position above the tooling ball 16. Tension screws 30—30 operate as a tensioning means that cooperatively engages the first plate 18 and the second plate 20 for respectively frictionally forcing or relaxing the tooling ball 16 into or away from the aperture 22 to respectively retard or facilitate the rotation of the clamp 10 about the tooling ball 16. The scale means 21 which is supported by plate 20 may be situated to measure either horizontal distances (see FIGS. 1, 3, 4, 6 and 9) or the scale means 21 may be adjusted to measure vertical distances away from the support for the base plate 12 as illustrated in FIGS. 2 and 8. This is accomplished by merely taking the entire clamp 10 assembly and scale means 21 and rotating the same about the tooling ball 16 until the desired position for the scale means 21 is obtained.

Figure 9:
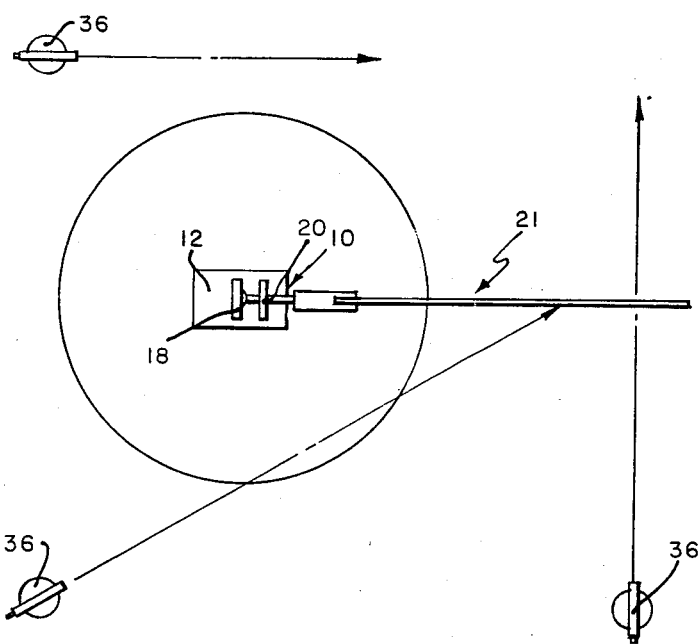
FIG. 9 is a top plan view of the invention utilized with a number of transits.

With continuing reference to the drawings for operation of the invention and the method for establishing a plane for lay-out purposes with the clamp means 10, a pair of the clamp means 10—10 is positioned on a jig 32 which is under construction (see FIGS. 2 and 8). The positioning of the pair is such that the scale means 21 is in a position to measure vertical distances (see FIG. 2) away from the jig 32 under construction. An independent scale means, generally illustrated as 34, is situated across the two scale means 21—21 of the pair of clamps 10 such that the horizontal of the independent scale means 34 defines and identifies the established plane for lay-out purposes. The independent scale means 34 can be adapted to a 45°, 60°, or 90° scale bubble. After the tension screws 30—30 are adjusted, they instantly lock and release with a slight twist of the scale means 34. The two clamp means 10 will hold the scale means 34 in any position, and eliminates figuring any measurement portion for the ball 16 during calculations. The clamps 10—10 can be hand held or self supporting, and can be used to set sign bars per incline. The clamps 10—10 eliminate the necessity for a person holding the scale means 34 and obviates the shaking of the scale means 34 like a hand held scale. The combination of the pair of clamps 10—10 supporting a pair of scale means 21—21 makes the establishment of a plane lay-out purposes more accurate, easier to read, fool proof, and will not give false readings. The foregoing advantages also apply to a single clamp 10 supporting a single scale means 21 for measuring either vertical distances or horizontal distances therefrom. Transits 36 may be utilized with the clamp means 10 and the scale means 21 combination for identifying lines of sight and benchmarks, as illustrated in FIG. 9. The clamp means 10 and the scale means 21 combination provide instant adjustment for 360° of horizontal rotation, and additionally provides instant adjustment from a horizontal to a vertical rotation.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A clamp for a tooling ball comprising a base plate means;
   a ball stand means secured to said base plate means;
   a tooling ball means including a face and bound to said ball stand means;
   and a clamp assembly means rotatably sandwiching said tooling ball means and supporting a scale means, or the like, for rotation about said tooling ball means;
   said clamp assembly means having a first plate defining a first aperture positioned at the lower part thereof for seating said tooling ball means;
   a second plate having a structure whose lower edge terminates into a generally semi-circular aperture wherethrough said scale means, or the like, passes to rotatably engage said tooling ball means, such as to be movable around the face thereof, said first plate positioned spacedly from said second plate;
   and a tensioning means cooperatively engaging said first and second plate for frictionally forcing or relaxing said tooling ball means into or away from said first aperture to retard or facilitate the rotation of said clamp assembly means about said tooling ball means.

2. The clamp of claim 1 wherein said first aperture has a diameter smaller than the diameter of said tooling ball means.

3. The clamp of claim 2 wherein said tensioning means comprises a pair of tension screw means threadably engaging said first and second plate at a position above said tooling ball means.

4. The clamp of claim 3 additionally comprising a shaft means integral with said scale means, or the like, said shaft means terminating into a structure generally compatible with the outside of the tooling ball means to facilitate the rotation of the clamp assembly means including the scale means, or the like, about the face of said tooling ball means.

5. A method for establishing a plane for lay-out purposes with a clamp assembly means including a first plate positioned spacedly from a second plate for rotatably sandwiching a tooling ball means bound to a tool ball stand supported on a base plate means and for supporting a scale means that rotatably engages the tooling ball means such as to be movable around the face thereof, said method comprising the steps of:

(a) positioning a pair of said clamp assembly means on a jig means under construction such that said scale means is in a position to measure vertical distances away from said jig means under construction; and (b) situating an independent scale means across the two scale means of said pair of clamp assembly means such that a horizontal edge of said independent scale means defines and identifies the established plane for lay-out purposes.

* * * * *